United States Patent [19]

Brightman

[11] Patent Number: 4,826,348

[45] Date of Patent: May 2, 1989

[54] COUPLING SET

[75] Inventor: Jacob Brightman, Ramat Hasharon, Israel

[73] Assignee: The State of Israel, Ministry of Defence, Israel Military Industries, Israel

[21] Appl. No.: 59,529

[22] Filed: Jun. 8, 1987

[30] Foreign Application Priority Data

Jan. 8, 1987 [IL] Israel .................................. 81200

[51] Int. Cl.$^4$ ............................................. B25G 3/18
[52] U.S. Cl. ................................... 403/330; 403/102; 256/25; 292/107
[58] Field of Search ....................... 403/330, 100, 102; 256/25, 26; 292/209, 107, 152

[56] References Cited

U.S. PATENT DOCUMENTS

| 706,350 | 8/1902 | Smith | 292/107 |
| 1,071,283 | 8/1913 | Weaver | 256/25 |
| 1,191,502 | 7/1916 | Emme | 292/152 X |
| 2,702,866 | 2/1955 | Anderson | 256/25 |

FOREIGN PATENT DOCUMENTS 116180 2/1930 Austria .............................. 403/100

Primary Examiner—Andrew V. Kundrat
Attorney, Agent, or Firm—Steinberg & Raskin

[57] ABSTRACT

A coupling set for interlocking objects. The set comprises first and second coupling elements each having an integral stud by which it is anchored in one of two objects to be interlocked. The first locking member has a swingable latch comprising a notch and a spring member. In the locking position the notch of latch engages the stud of the second locking member and the spring member snaps into a cavity in the head portion of the second locking member.

4 Claims, 1 Drawing Sheet

COUPLING SET

FIELD AND BACKGROUND OF THE INVENTION

The present invention concerns coupling means for connecting and locking together objects such as, for example, modular units of an assembly.

There are instances where objects have to be put together quickly in a fashion which combines a fast and structurally solid connection with a safe lock secured against any spontaneous disengagement while at the same time enabling intentional unlocking and dismantling. It is thus the object of the present invention to meet these requirements by providing coupling means combining a solid connection capacity with a safe lock ability.

GENERAL DESCRIPTION OF THE INVENTION

In accordance with the present invention there is provided a coupling set adapted to alternate between locking and unlocking position and serving for holding tightly and locking together objects, which coupling set comprises first and second locking elements each having an integral stud adapted to be anchored in one of said objects, said first locking element comprising a notched latch with upper and lower faces and being switchable in a plane normal to the axis of the associated stud, which latch is adapted to engage in the locking position the stud of the second locking element and comprises at its upper face a spring member extending across said notch; and said second locking element comprising a cavity adapted to snappingly receive said spring member in the locking position.

In operation the studs of said first and second locking elements are anchored in the two objects to be coupled and locked together in such positions, that upon locking the objects come to bear tightly on each other. For connecting and locking, the objects are juxtaposed and the swingable latch is then turned into the locking position in which said notch engages the stud associated with said second locking element and said spring member snaps into said cavity.

Preferably, the second locking element comprises a gliding surface which guides the spring member during the connecting and locking operation to gradually lift or bend and thereby tension the spring member until the latter snaps into said cavity.

In accordance with one embodiment the spring member of the first locking element is oblong having the shape of a rod or bar, preferably the cavity of the second locking element is in form of an elongated groove.

Once said spring member has snapped into said cavity, the coupling set according to the invention cannot be unlocked spontaneously and it thus affords a safe interlocking connection between the two objects with which the set is associated. If desired, several objects can be connected and locked together by means of a plurality of coupling sets according to the invention.

Where it is desired to dismantle an assembly of bodies coupled together by means of one or more coupling sets according to the invention, the spring member of the first locking element in each set has to be forceably lifted out of the cavity in the second locking element thereof, and in a preferred embodiment of the invention the cavity is so profiled as to facilitate such lifting, e.g. by having one of the side walls slanted so that when the first locking element is forceably turned out of engagement the spring member glides along the slanted side wall.

DESCRIPTION OF THE DRAWINGS

For better understanding the invention will now be described, by way of example only, with reference to the annexed drawings in which.

DETAILED DESCRIPTION OF ONE EMBODIMENT

Figure 1:
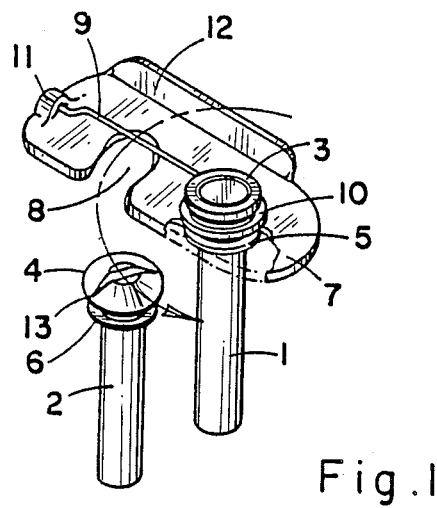
FIG. 1 is a perspective view of a coupling set according to the invention in the unlocking position with the associated objects that are to be connected being removed.

The coupling set according to the invention here illustrated comprises first and second studs 1 and 2 with head portions 3 and 4, respectively. Underneath head portions 3 and 4 there are provided collars 5 and 6, respectively, which ensure that when studs 1 and 2 are anchored in the objects which are to be coupled, the head portions 3 and 4 remain projecting. Near head portion 3 of stud 1 there is hinged a flat latch 7 having a notch 8 and constituting the locking member of the first locking element. Notch 8 is so shaped as to adapt latch 7 for hooking on stud 2 in the locking position. Latch 5 is swingable in a plane which is normal to the longitudinal axis of the associated stud 1, and in the locking position it engages stud 2 between head portion 4 and collar 6 thereof.

An oblong spring member 9 having the shape of a rod or bar extends across the upper face of latch 7 with one end thereof being wound around the upper part of the associated stud 1 between head 3 and an annular disc 10, while the other end is retained inside a bore of a lug 11. A bracket 12 of latch 7 serves as handle.

Figure 2:
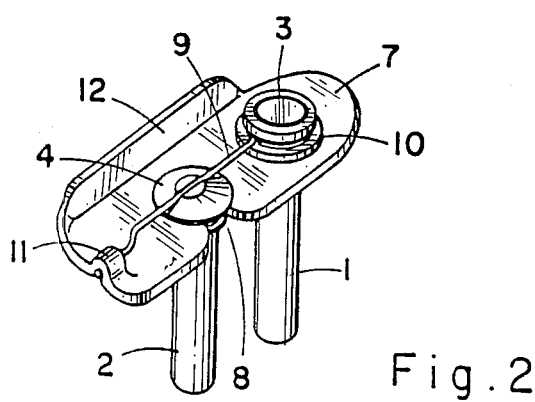
FIG. 2 is a perspective view of the same coupling set in the locking position.

The upper side of head 4 of the second stud 2 comprises a groove-like cavity 13 adapted to snappingly receive the spring member 9 in the locked position shown in FIG. 2. Head 4 is bulging in such a way that when latch 5 is turned in the direction of the arrow in FIG. 1 the spring member 9 is guided into cavity 13 by being gradually bent and tensioned until it reaches the edge of cavity 13 whereupon the spring member snaps into the cavity.

When the above coupling set has to be unlocked the spring member 9 has to be forceably lifted out of cavity 13 and in order to facilitate this the side wall of the cavity on the side of the direction in which latch 7 has to be turned for unlocking, is preferably slanted.

From the foregoing description it is easily understood that once spring member 9 has snapped into recess 13, the locking set cannot unlock spontaneously. Furthermore, by the provision of studs 1 and 2 which can be of any suitable length, the coupling set according to the invention also provides a structurally firm connection between the two objects in which studs 1 and 2 are anchored. It is thus seen that the coupling set according to the invention provides in a simple way reliable, quickly operable combined connecting and locking means.

I claim:

1. A coupling set adapted to alternate between a locking and unlocking position and serving for holding tightly and locking together objects, which coupling set comprises first and second locking elements, said first locking element comprising a notched latch with upper and lower faces pivotally mounted on a first stud and being swingable in a plane normal to the axis of said first stud and said second locking element comprising an integral second stud, said notched latch being adapted to engage in the locking position said second stud and comprises at its upper face a spring member extending across said notch; and said second locking element comprising a cavity in the form of a groove adapted to snappingly receive said spring member in the locking position, said groove having a slanted wall forming a side wall thereof, whereby forceable lifting of said spring member out of said groove is facilitated.

2. A snap lock set according to claim 1 wherein said latch has an essentially flat configuration.

3. A coupling set according to claim 1 wherein said spring member is oblong having the shape of a rod or bar.

4. A coupling set according to claim 1 wherein said second locking element comprises a guiding surface for guiding said spring member into said cavity.

* * * * *